(12) United States Patent
Huang et al.

(10) Patent No.: US 9,202,116 B2
(45) Date of Patent: Dec. 1, 2015

(54) IMAGE PROCESSING METHOD AND IMAGE PROCESSING APPARATUS USING THE SAME

(71) Applicant: National Taipei University of Technology, Taipei (TW)

(72) Inventors: Shih-Chia Huang, Taipei (TW); Bo-Hao Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 144 days.

(21) Appl. No.: 14/065,425

(22) Filed: Oct. 29, 2013

(65) Prior Publication Data

US 2015/0117761 A1 Apr. 30, 2015

(51) Int. Cl.
G06K 9/00 (2006.01)
G06K 9/66 (2006.01)
G06K 9/62 (2006.01)
G06T 7/20 (2006.01)

(52) U.S. Cl.
CPC .......... *G06K 9/00771* (2013.01); *G06K 9/6202* (2013.01); *G06K 9/66* (2013.01); *G06T 7/2053* (2013.01); *G06T 2207/20021* (2013.01); *G06T 2207/20081* (2013.01); *G06T 2207/30232* (2013.01)

(58) Field of Classification Search
CPC ............................ G06K 9/66; G06K 9/00771
See application file for complete search history.

(56) References Cited

U.S. PATENT DOCUMENTS

| | | | |
|---|---|---|---|
| 6,512,537 B1* | 1/2003 | Shimizu et al. | 348/155 |
| 6,681,058 B1* | 1/2004 | Hanna et al. | 382/294 |
| 7,215,795 B2* | 5/2007 | Ito et al. | 382/103 |
| 7,957,592 B2* | 6/2011 | Huang et al. | 382/173 |
| 8,218,864 B2* | 7/2012 | Wang | G06K 9/34 |
| | | | 382/103 |
| 8,311,277 B2* | 11/2012 | Peleg et al. | G06F 17/3079 |
| | | | 382/103 |
| 2004/0120581 A1* | 6/2004 | Ozer | G06K 9/00335 |
| | | | 382/224 |
| 2006/0291696 A1* | 12/2006 | Shao | G06K 9/3216 |
| | | | 382/103 |
| 2007/0058837 A1* | 3/2007 | Boregowda et al. | G06T 7/2013 |
| | | | 382/103 |
| 2008/0130948 A1* | 6/2008 | Ozer | G06K 9/00228 |
| | | | 382/103 |
| 2008/0181499 A1* | 7/2008 | Yang et al. | 382/174 |
| 2009/0154565 A1* | 6/2009 | Jeong et al. | 375/240.16 |

(Continued)

OTHER PUBLICATIONS

Zhou and Zhang, "Modified GMM Background Modeling and Optical Flow for Detection of Moving Objects," Systems, Man and Cybernetics, 2005 IEEE International Conference, Oct. 10-12, 2005, pp. 2224-2229, vol. 3.

(Continued)

*Primary Examiner* — Gregory M Desire
(74) *Attorney, Agent, or Firm* — Jianq Chyun IP Office

(57) ABSTRACT

The invention discloses an image processing method and an imager processing apparatus using the same. The method includes the following steps: receiving an training image; finding a minimum difference among the differences; determining whether the minimum difference is larger than a first threshold; if no, generating a first output value according to the first pixel, the background candidates and a plurality of weightings corresponding to the background candidates; updating a first background candidate corresponding to the minimum difference; updating a first weighting related to the first background candidate; if yes, adding the first pixel as a new background candidate to the background candidates and adding a new weighting corresponding to the new background candidate to the weightings; and detecting whether a moving object existing in an incoming image according to the background candidates and the weightings.

14 Claims, 3 Drawing Sheets

(56) References Cited

U.S. PATENT DOCUMENTS

| | | | |
|---|---|---|---|
| 2010/0290710 A1* | 11/2010 | Gagvani et al. | 382/224 |
| 2010/0316257 A1* | 12/2010 | Xu | G06K 9/00771 382/103 |
| 2015/0117761 A1* | 4/2015 | Huang et al. | 382/159 |

OTHER PUBLICATIONS

Manzanera and Richefeu, "A new motion detection algorithm based on Σ-Δ background estimation," Pattern Recognition Letters, Feb. 2007, pp. 320-328.

Ha and Lee, "Foreground objects detection using multiple difference images," Optical Engineering, Apr. 1, 2010, pp. 047201-1-047201-5.

Manzanera and Richefeu, "A robust and computationally efficient motion detection algorithm based on Σ-Δ background estimation," Indian Conference on Computer Vision, Graphics and Image Processing, Dec. 2004, pp. 46-51.

Oral and Deniz, "Centre of mass model—A novel approach to background modelling for segmentation of moving objects," Image and Vision Computing, Oct. 2007, pp. 1365-1376, vol. 25.

* cited by examiner

IMAGE PROCESSING METHOD AND IMAGE PROCESSING APPARATUS USING THE SAME

BACKGROUND

1. Field of the Invention

The invention relates to an image processing method and an image processing apparatus using the same.

2. Description of Related Art

Video surveillance systems have wide areas of scientific and technological application, such as computer vision, transport networks, elderly care, traffic monitoring, general analysis, endangered species conservation, and so on. The architecture of video surveillance system applications encompasses several tasks such as motion detection, identification, object classification, tracking, behavior recognition, and activity analysis. Motion detection is the first essential process in video surveillance systems and plays an important role during which the extraction of moving objects in video streams is accomplished. Many motion detection approaches have been proposed by which to achieve complete and accurate detection in sequences of normal visual quality. There are several major categories of conventional motion detection approaches. These include optical flow, temporal difference, and background subtraction. Optical flow can achieve detection very well by projecting motion on the image plane with proper approximation. However, this method is very sensitive to noise and can be computationally inefficient. For example, outdoor scenes are not computationally affordable for real-time applications. Temporal differencing detects moving objects by calculating the difference between consecutive frames, and can effectively accommodate environmental changes. However, it has a tendency to extract incomplete shapes of moving objects, particularly when those objects are motionless or exhibit limited mobility in the scene. To solve this problem, the very popular motion detection method of background subtraction is often used. Background subtraction detects moving objects in a video sequence by evaluating the pixel feature differences between the current image and a reference background image. This method not only provides very high quality motion information, but also demands less computational complexity than other motion detection methods. All in all, the background subtraction technique is the most effective method by which to solve motion detection problems.

The need for precise motion detection has increased dramatically since the 9/11 attacks, which has subsequently led to higher demand for a more reliable and accurate background model generated through background subtraction. As a consequence, many background subtraction-based methods have been proposed to segment moving objects in video sequence.

In recent years, research conducted in the area of video surveillance systems has been oriented towards the low-quality video streams prevalent in many real-world limited bandwidth networks. Handheld media and mobile devices have gained popularity, as have real-time video applications on wireless networks such as video conferencing, security monitoring, and so on. However, video communications over wireless networks can easily suffer from network congestion or unstable bandwidth. The quality of network services is seriously degraded whenever the traffic exceeds the available amount of network bandwidth. Rate control is an important video coding tool which attempts to lessen video quality and produce lower bit rate video streams in order to match the available wireless network bandwidth, thereby minimizing network congestion. In general, most background subtraction methods suffice for situations involving normal video quality.

However, complete and accurate motion detection in variable bit-rate video streams is a very difficult challenge. The main reason for this is that the generated background models of the previous background subtraction methods may not be applicable in the different real-world bandwidth networks with variable bit-rate compressed video.

Specifically, the previously proposed background subtraction methods did not consider the situation that the qualities of images to be processed may adaptively change. If these methods are applied to deal with images with variable bit rates, the generated background models may easily lead to error detections or false alarms.

Taking FIG. 1A as an example, FIG. 1A is a schematic diagram illustrating the situation about generating the background models according to high-quality images. It is assumed that the $0^{th}$ frame to the $300^{th}$ frame, which correspond to high-quality images, are adopted to generate the background models, and the frames after the $300^{th}$ frame are low-quality frames. As could be observed in FIG. 1A, the background model generated based on high-quality images would be inherently full of fluctuations. Therefore, when a moving object occurs around the $310^{th}$ to the $350^{th}$ frame, which corresponds to low-quality images, the moving object would be considered as just fluctuations similar to the fluctuations existing in the background models. That is, the moving object cannot be correctly recognized, and hence the error detection occurs.

Taking FIG. 1B as another example, FIG. 1B is a schematic diagram illustrating the situation about generating the background models according to low-quality images. It is assumed that the $0^{th}$ frame to the $600^{th}$ frame, which correspond to low-quality images, are adopted to generate the background models, and the frames after the $600^{th}$ frame are high-quality frames. As could be observed in FIG. 1B, the background model generated based on low-quality images would be inherently smooth. Therefore, the fluctuations occur at the frames after the $600^{th}$ frame would be considered as corresponding to moving objects, even though the fluctuations are just disturbances inherently included in high-quality images, i.e., background signals. That is, the background signals might be accidentally considered as corresponding to moving objects, and hence leads to a false alarm.

SUMMARY

Accordingly, the present invention is directed to an image processing method and an image processing apparatus using the same, which could accurately detect moving objects with a diversely constructed background model.

An image processing method is introduced herein. The method is adapted to an image processing apparatus. The method includes the following steps: receiving an training image, which at least comprises a first pixel; calculating differences between the first pixel and a plurality of background candidates; finding a minimum difference among the differences; determining whether the minimum difference is larger than a first threshold; if no, generating a first output value according to the first pixel, the background candidates and a plurality of weightings corresponding to the background candidates; updating a first background candidate corresponding to the minimum difference by adding a first factor to the first background candidate, wherein the first factor is related to the first pixel, a first learning rate and the first background candidate; updating a first weighting related to the first background candidate by adding a second factor to the first weighting, wherein the second factor is related to the first output value, a second learning rate and the first weighting; if yes, adding the first pixel as a new background candidate to the background candidates and adding a new weighting corresponding to the new background candidate to the weightings; and detecting whether a moving object existing in an incoming image according to the background candidates and the weightings.

In one embodiment of the present invention, the step of calculating the differences between the first pixel and the background candidates includes: calculating first Euclidean distances between the first pixel and the background candidates.

In one embodiment of the present invention, the step of updating the first background candidate corresponding to the minimum difference by adding the first factor to the first background candidate comprises: updating the first background candidate according to:

$$B(x,y)_{win}' = B(x,y)_{win} + \alpha[p_t(x,y) - B(x,y)_{win}],$$

wherein $p_t(x,y)$ is a pixel intensity value of the first pixel, (x,y) is a coordinate, $B_{win}(x,y)$ is a background intensity value of the first background candidate, a is the first learning rate and $B_{win}(x,y)'$ is a background intensity value of the updated first background candidate.

In one embodiment of the present invention, the step of updating the first weighting related to the first background candidate by adding the second factor to the first weighting comprises: updating the first weighting according to:

$$\pi(x,y)_{win}' = \pi(x,y)_{win} + \beta[Y_t(x,y) - \pi(x,y)_{win}],$$

wherein $Y_t(x,y)$ is the first output value, (x,y) is a coordinate, $\pi(x,y)_{win}$ is the first weighting, $\beta$ is the second learning rate and $\pi(x,y)_{win}'$ is the updated first weighting.

In one embodiment of the present invention, the incoming image at least comprises a block, the block at least comprises an incoming pixel, and the step of detecting whether the moving object existing in the incoming image according to the background candidates and the weightings comprises: calculating second Euclidean distances between the incoming pixel and the background candidates corresponding to the incoming pixel; summing the second Euclidean distances to calculate a summed distance corresponding to the incoming pixel; summing the summed distance of each of a plurality of pixels comprised in the block to calculate a first parameter of the block; determining whether the first parameter of the block is smaller than a second threshold; if yes, linearly combining the second Euclidean distances according to the weightings to calculate a second output value of the incoming pixel; determining whether the second output value is smaller than a third threshold; if yes, determining the incoming pixel corresponds to the moving object.

In one embodiment of the present invention, after the step of determining whether the first parameter of the block is smaller than the second threshold, the method further includes: if the first parameter of the block is not smaller than the second threshold, determining the block corresponds to a background.

In one embodiment of the present invention, after the step of determining whether the second output value is smaller than the third threshold, the method further includes: if the second output value is not smaller than the third threshold, determining the incoming pixel corresponds to a background.

An image processing apparatus is introduced herein. The image processing apparatus includes a storage unit and a processing unit. The storage unit is configured to store a plurality of modules. The processing unit is coupled to the storage unit and configured to execute the modules to: receive an training image, which at least comprises a first pixel; calculate differences between the first pixel and a plurality of background candidates; find a minimum difference among the differences; determine whether the minimum difference is larger than a first threshold; if no, generate a first output value according to the background candidates and a plurality of weightings corresponding to the background candidates; update a first background candidate corresponding to the minimum difference by adding a first factor to the first background candidate, wherein the first factor is related to the first pixel, a first learning rate and the first background candidate; update a first weighting related to the first background candidate by adding a second factor to the first weighting, wherein the second factor is related to the first output value, a second learning rate and the first weighting; if yes, add the first pixel as a new background candidate to the background candidates and adding a new weighting corresponding to the new background candidate to the weightings; and detect whether a moving object existing in an incoming image according to the background candidates and the weightings.

In one embodiment of the present invention, the processing unit calculates first Euclidean distances between the first pixel and the background candidates.

In one embodiment of the present invention, the processing unit updates the first background candidate according to:

$$B(x,y)_{win}' = B(x,y)_{win} + \alpha[p_t(x,y) - B(x,y)_{win}],$$

wherein $p_t(x,y)$ is a pixel intensity value of the first pixel, (x,y) is a coordinate, $B_{win}(x,y)$ is a background intensity value of the first background candidate, $\alpha$ is the first learning rate and $B_{win}(x,y)$ is a background intensity value of the updated first background candidate.

In one embodiment of the present invention, the processing unit updates the first weighting according to:

$$\pi(x,y)_{win}' = \pi(x,y)_{win} + \beta[Y_t(x,y) - \pi(x,y)_{win}],$$

wherein $Y_t(x,y)$ is the first output value, (x,y) is a coordinate, $\pi(x,y)_{win}$ is the first weighting, $\beta$ is the second learning rate and $\pi(x,y)_{win}'$ is the updated first weighting.

In one embodiment of the present invention, the incoming image at least comprises a block, the block at least comprises an incoming pixel, and the processing unit is configured to: calculate second Euclidean distances between the incoming pixel and the background candidates corresponding to the incoming pixel; sum the second Euclidean distances to calculate a summed distance corresponding to the incoming pixel; sum the summed distance of each of a plurality of pixels comprised in the block to calculate a first parameter of the block; determine whether the first parameter of the block is smaller than a second threshold; if yes, linearly combine the second Euclidean distances according to the weightings to calculate a second output value of the incoming pixel; determine whether the second output value is smaller than a third threshold; if yes, determine the incoming pixel corresponds to the moving object.

In one embodiment of the present invention, if the first parameter of the block is not smaller than the second threshold, the processing unit determines the block corresponds to a background.

In one embodiment of the present invention, if the second output value is not smaller than the third threshold, the processing unit determines the incoming pixel corresponds to a background.

Based on the above description, the embodiments of the present invention provide an image processing method and an image processing apparatus using the same. The method proposed in the present invention could build a background model with diversely selected background candidates. Therefore, the background model could include abundant information related to high-quality images and low-quality images.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
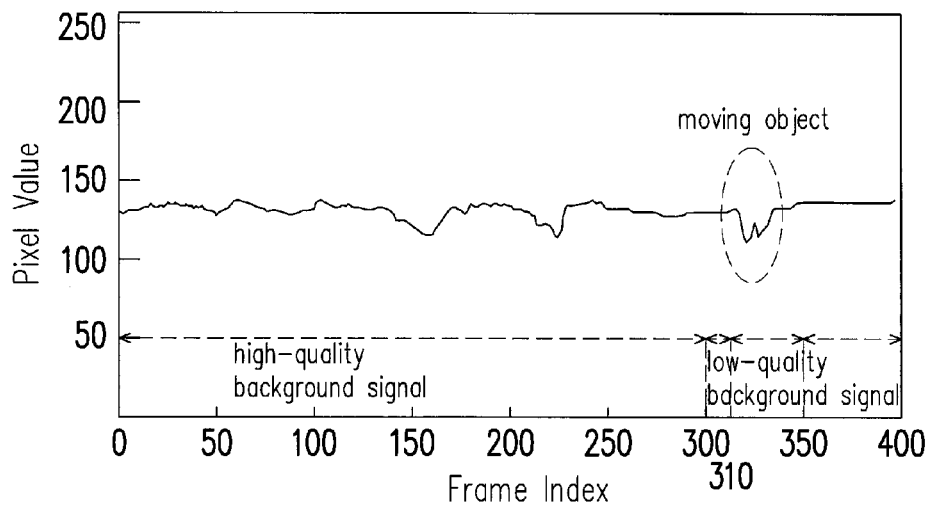
FIG. 1A is a schematic diagram illustrating the situation about generating the background models according to high-quality images.
Figure 1B:
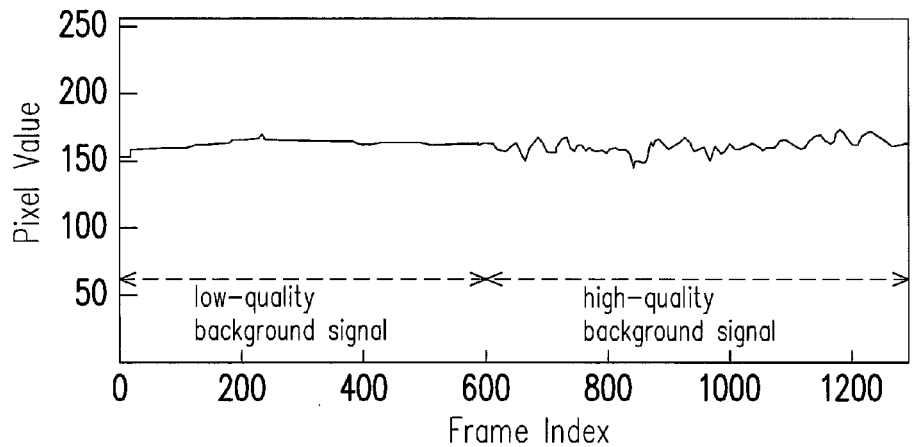
FIG. 1B is a schematic diagram illustrating the situation about generating the background models according to low-quality images.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Figure 2:
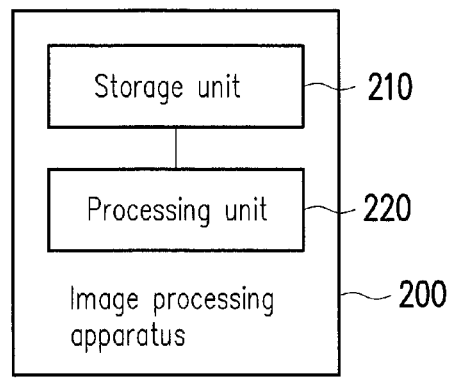
FIG. 2 is a block diagram illustrating an image processing apparatus according to an exemplary embodiment of the present invention.

FIG. 2 is a block diagram illustrating an image processing apparatus according to an exemplary embodiment of the present invention. In the present embodiment, an image processing apparatus 200 includes a storage unit 210 and a processing unit 220. The storage unit 210 is one or a combination of a stationary or mobile random access memory (RAM), read-only memory (ROM), flash memory, hard disk, or any other similar device, and which records a plurality of modules that can be executed by the processing unit 220. These modules can be loaded into the processing unit 220 to execute an image processing method.

The processing unit 220 is one or a combination of a central processing unit (CPU), a programmable general- or specific-purpose microprocessor, a digital signal processor (DSP), a programmable controller, application specific integrated circuits (ASIC), a programmable logic device (PLD), or any other similar device. The processing unit 220 is coupled to the storage unit 210. The processing unit 220 may access and execute the modules recorded in the storage unit 210 to execute an image processing method proposed in the present invention, which would be introduced later.

In the present embodiment, the proposed image processing apparatus 200 may construct a background model according to many training images, such that the background model may contain abundant information related to high-quality images and low-quality images. With the diversely constructed background model, when receiving an incoming image, the image processing apparatus 200 may accurately recognize whether there exist moving objects in the incoming image no matter the incoming image is a high-quality image or a low-quality image. Details would be provided hereinafter.

Figure 3:
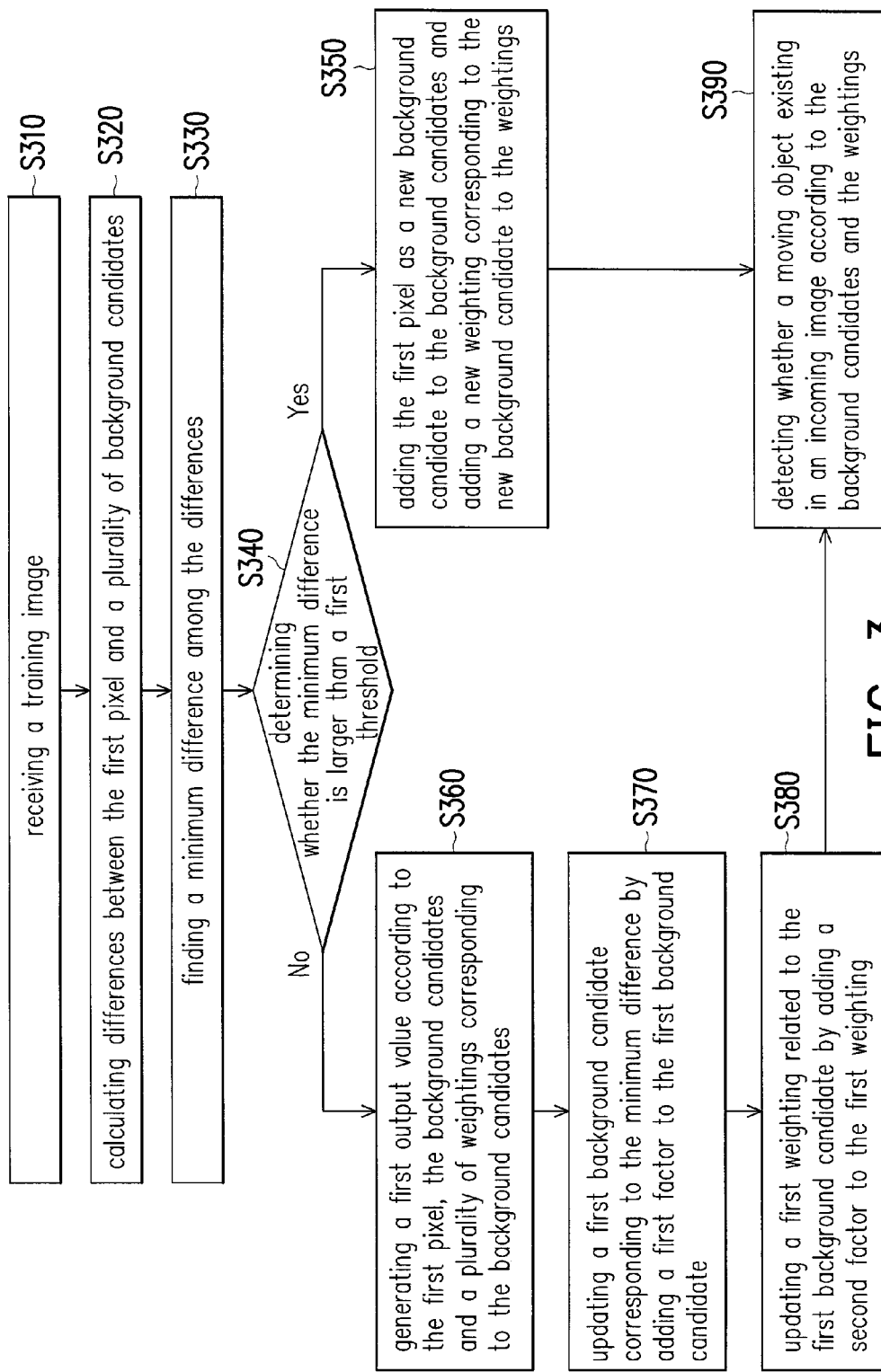
FIG. 3 is a flow chart illustrating the image processing method according to an exemplary embodiment of the present invention.

FIG. 3 is a flow chart illustrating the image processing method according to an exemplary embodiment of the present invention. The method proposed in the present embodiment may be performed by the image processing method 200 of FIG. 2, and the steps would be discussed with reference to the elements illustrated in FIG. 2.

In step S310, the processing unit 220 may receive a training image. The training image may come from an image encoder or other similar devices that could adaptively send high-quality images and/or low-quality images. That is, the training image could be a high-quality image or a low-quality image. The training image may include several first pixels. However, the following discussion would be provided by discussing one of the first pixels for brevity.

In step S320, the processing unit 220 may calculate differences between the first pixel and a plurality of background candidates. The background candidates may be pixels respectively locating on other previously processed training images, which could be stored in the storage unit 210, but the invention is not limited thereto.

In some embodiments, the coordinates of the background candidates locating on the previously processed training images are the same as the coordinate of the first pixel locating on the training image. For example, if the coordinate where the first pixel locating on the training image is (x,y), the coordinates where the background candidates on the previously processed training images are also (x,y).

In one embodiment, the differences between the first pixel and the background candidates could be characterized by first Euclidean distances between the pixel intensity value of the first pixel and the background intensity value of the background candidates. For example, the difference between the first pixel and the background candidate of the $k^{th}$ previously processed training image could be characterized by:

$$d(p_t(x,y),B(x,y)_k) = \|p_t(x,y) - B(x,y)_k\|_2^2,$$

where $d(p_t(x,y),B(x,y)_k)$ is the first Euclidean distance between $p_t(x,y)$ and $B(x,y)_k$, $p_t(x,y)$ is a pixel intensity value of the first pixel and $B(x,y)_k$ is the background intensity value of the background candidate of the $k^{th}$ previously processed training image. In some embodiments, the pixel intensity value of the first pixel could be characterized by the $YC_bC_r$ components of the first pixel, where Y, $C_b$ and $C_r$ respectively represent luminance, blue-difference chroma and red-difference chroma of the first pixel. Besides, the background intensity value of each of the background candidate could also be characterized by corresponding $YC_bC_r$ components, but the invention is not limited herein.

After calculating the difference between the first pixel and each of the background candidates, in step S330, the processing unit 220 may find a minimum difference among the differences. In the present embodiment, the background candidate corresponding to the minimum difference is referred as a first background candidate.

In step S340, the processing unit 220 may determine whether the minimum difference is larger than a first threshold. The first threshold could be an empirical tolerance between 20 and 30, but the invention is not limited thereto. If yes, the processing unit 220 could perform step S350 to add the first pixel as a new background candidate to the background candidates and add a new weighting (e.g., 1) corresponding to the new background candidate to the weightings.

From another point of view, if the minimum difference is larger than the first threshold, which means that the first pixel is highly different from the background candidates, the processing unit 220 may incorporate the first pixel into the background candidates to enhance the diversity of the background candidates.

On the other hand, if the minimum difference is not larger than the first threshold, the processing unit 220 may perform step S360 to generate a first output value according to the first pixel, the background candidates and a plurality of weightings corresponding to the background candidates. Specifically, the processing unit 220 may respectively calculate second Euclidean distances between the first pixel and the background candidates according to a Gaussian membership function. For example, the second Euclidean distance between the first pixel and the background candidate of the $i^{th}$ previously processed training image could be characterized by:

$$S_i(p_i(x, y), B(x, y)_i) = \exp\left(\frac{-\|p_t(x, y) - B(x, y)_i\|^2}{2\Delta^2}\right),$$

where $S_i(x,y), B(x,y)_i$ is the second Euclidean distance between $p_t(x,y)$ and $B(x,y)_k$, $\Delta$ is an empirical tolerance between 10 and 20, but the invention is not limited thereto. After calculating the second Euclidean distances between the first pixel and the background candidates, the processing unit 220 may sum all of the second Euclidean distances multiplied by corresponding weightings to obtain the first output value related to the first pixel.

Next, in step S370, the processing unit 220 may update the first background candidate corresponding to the minimum difference by adding a first factor to the first background candidate. Specifically, the processing unit 220 may update the first background candidate according to:

$$B(x,y)_{win}' = B(x,y)_{win} + \alpha[p_t(x,y) - B(x,y)_{win}],$$

where $B_{win}(x,y)$ is a background intensity value of the first background candidate, $\alpha$ is the first learning rate (which may be a value between 0.01 and 0.02, but the invention is not limited thereto) and $B_{win}(x,y)'$ is a background intensity value of the updated first background candidate.

Afterwards, in step S380, the processing unit 220 may update a first weighting related to the first background candidate by adding a second factor to the first weighting. Specifically, the processing unit 220 may update the first weighting according to:

$$\pi(x,y)_{win}' = \pi(x,y)_{win} + \beta[Y_t(x,y) - \pi(x,y)_{win}],$$

where $Y_t(x,y)$ is the aforementioned first output value, $\pi(x,y)_{win}$ is the first weighting, $\beta$ is the second learning rate (which may be a value between 0.002 and 0.005 and $\pi(x,y)_{win}'$ is the updated first weighting.

From another point of view, if the minimum difference is not larger than the first threshold, which represents that the first pixel is similar to the first background candidate, the processing unit 220 may simply update the first background candidate and its corresponding weighting in the aforementioned ways, instead of incorporating the first pixel into the background candidates.

In some embodiments, the image processing apparatus 200 may perform the steps S310-S380 for many times to process lots of training images to build a background model with diversely selected background candidates. With the increasing number of processed training images, the background candidates included in the background model are more and more diversified. Therefore, the background model would be more possible to include abundant information related to high-quality images and low-quality images.

Subsequently, in step S390, the processing unit 220 may detect whether a moving object existing in an incoming image according to the background candidates and the weightings. Since the background model corresponding to these background candidates and the weighting has abundant information related to high-quality images and low-quality images, the possibility for the processing unit 220 to accurately recognize the moving object would be relatively increased. Details related to the mechanism that the processing unit 220 adopts to detect the moving object existing in the incoming image are provided hereinafter.

Figure 4:
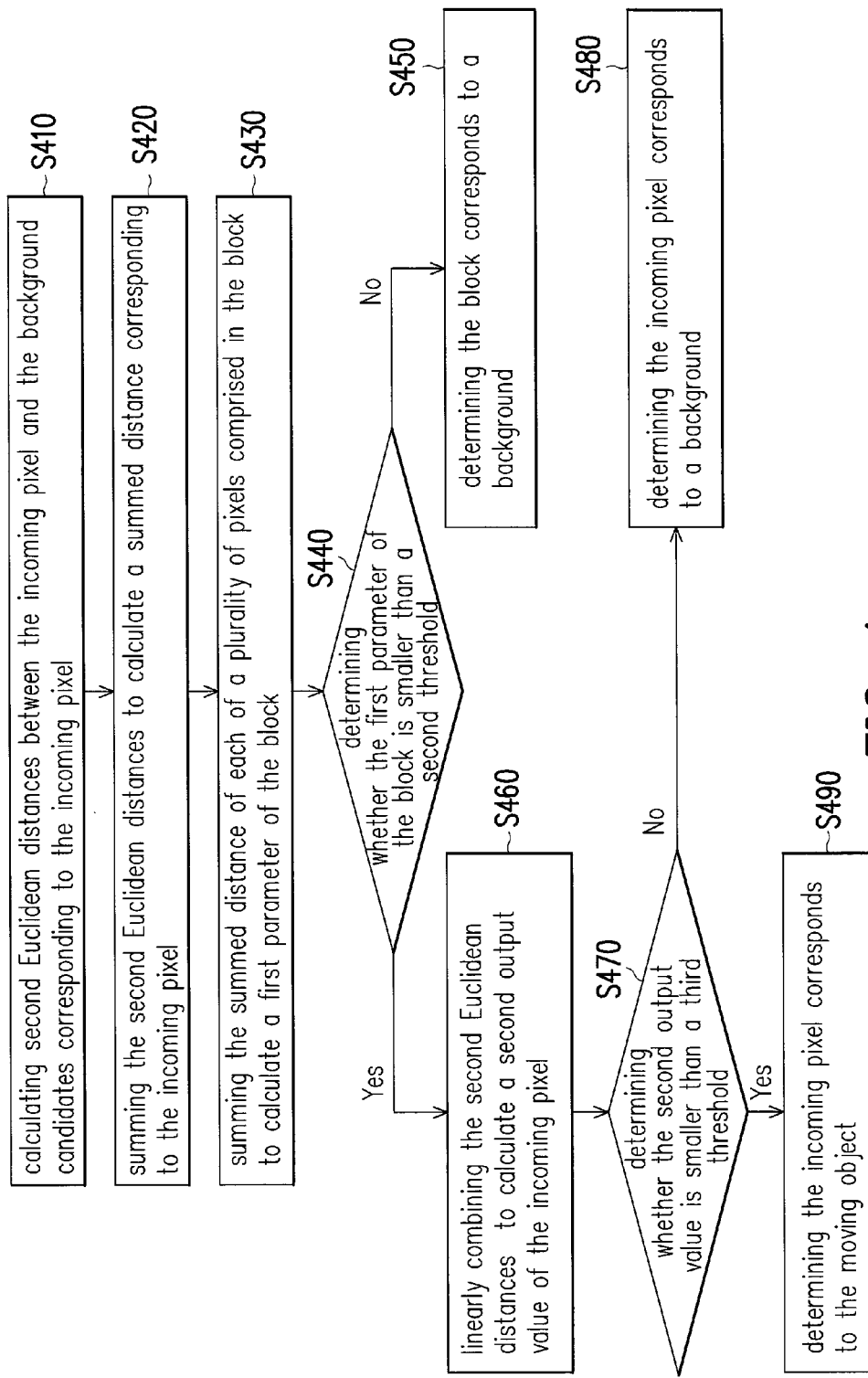
FIG. 4 is a flow chart illustrating the details of detecting the moving object of the incoming image according to FIG. 3.

Referring to FIG. 4, FIG. 4 is a flow chart illustrating the details of detecting the moving object of the incoming image according to FIG. 3. The method proposed in the present embodiment may be performed by the image processing method 200 of FIG. 2, and the steps would be discussed with reference to the elements illustrated in FIG. 2.

In step S410, the processing unit 220 may calculate second Euclidean distances between the incoming pixel and the background candidates corresponding to the incoming pixel. More specifically, the background candidates used in step S410 are the background candidates included in the background model after the background model is well trained.

In the present embodiment, the incoming image may be divided into several blocks, and each of the blocks may include several incoming pixels. However, the following discussion would be provided by discussing one of the incoming pixels for brevity.

In some embodiments, the second Euclidean distances between the incoming pixel and the background candidates corresponding to the incoming pixel could be calculated according to:

$$S_i(p_i, W_i) = \exp\left(\frac{-\|p_t - W_i\|^2}{2\Delta^2}\right),$$

where $S_i(p_t, W_i)$ is the second Euclidean distance between $p_t$ and $W_i$, $p_t$ is the pixel intensity value of the incoming pixel and $W_i$ is the background intensity value of the $i^{th}$ background candidate included in the background model.

After calculating the second Euclidean distances between the incoming pixel and each of the background candidates included in the background model, in step S420, the processing unit 220 may sum the second Euclidean distances to calculate a summed distance corresponding to the incoming pixel. For example, the summed distance may be represented by $$\sum_{i=1}^{M} S_i(p_t, W_i),$$

where M is the number of the background candidates corresponding to the incoming pixel.

In step S430, the processing unit 220 may sum the summed distance of each of a plurality of pixels comprised in the block to calculate a first parameter of the block. As mentioned before, the block may include lots of pixels, and hence the processing unit 220 could obtain a summed distance for each of the incoming pixels included in the block according to the aforementioned teachings.

That is, for a single block, the processing unit 220 may sum the summed distances corresponding to the incoming pixels included in this block to calculate the first parameter of this block. It should be noted that the first parameter of the block could be regarded as a reference for preliminarily determining whether the block has a possibility to be corresponding to a moving object.

Hence, in step S440, the processing unit 220 may determine whether the first parameter of the block is smaller than a second threshold. The second threshold may be a value between 0.6 and 0.8, but the invention is not limited thereto. If the first parameter of the block is not smaller than the second threshold, in step S450, the processing unit 220 may determine the block corresponds to a background. That is, the block does not contain any information related to moving objects. From another point of view, the processing unit 220 determines that no moving object is detected in the block if the first parameter of the block is smaller than the second threshold. Therefore, the processing unit 220 could directly ignore the block and stop further analyzing the block.

On the other hand, if the first parameter of the block is smaller than the second threshold, in step S460, the processing unit 220 may linearly combining the Euclidean distances to calculate a second output value of the incoming pixel. Specifically, the processing unit 220 may calculate the second output value of the incoming pixel according to $$\sum_{i=1}^{M} S_i \pi_i,$$

where $\pi_i$ is the weighting corresponding to the $i^{th}$ background candidate included in the background model.

Next, in step S470, the processing unit 220 may determine whether the second output value is smaller than a third threshold. The third threshold may be an empirical value between 0.7 and 0.9, but the invention is not limited thereto. If the second output value is not smaller than the third threshold, in step S480, the processing unit 220 may determine the incoming pixel corresponds to a background. That is, the incoming pixel does not contain any information related to moving objects.

On the other hand, if the second output value is smaller than the third threshold, in step S490, the processing unit 220 may determine the incoming pixel corresponds to the moving object. That is, the processing unit 220 would consider the incoming pixel as containing information related to moving objects.

To sum up, the embodiments of the present invention provide an image processing method and an image processing apparatus using the same. The method proposed in the present invention could build a background model with diversely selected background candidates. Therefore, the background model could include abundant information related to high-quality images and low-quality images. Besides, no matter which image encoding standard is applied to the training image, the proposed method could always construct a corresponding background model, such that the proposed method could be adopted to handle the images encoded according to various image encoding standard.

Furthermore, since the blocks less probable to contain information related to moving objects could be ignored in advance, the proposed method could significantly lower the needed time for detecting moving objects of the incoming image, such that the detecting efficiency could be enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing method, adapted to an image processing apparatus, comprising:
   receiving an training image, which at least comprises a first pixel;
   calculating differences between the first pixel and a plurality of background candidates, wherein the background candidates are pixels respectively locating on other previously processed training images, and a coordinate of each background candidates is identical to a coordinate of the first pixel;
   finding a minimum difference among the differences;
   determining whether the minimum difference is larger than a first threshold;
   if no, generating a first output value according to the first pixel, the background candidates and a plurality of weightings corresponding to the background candidates;
   updating a first background candidate corresponding to the minimum difference by adding a first factor to the first background candidate, wherein the first factor is related to the first pixel, a first learning rate and the first background candidate;
   updating a first weighting related to the first background candidate by adding a second factor to the first weighting, wherein the second factor is related to the first output value, a second learning rate and the first weighting
   if yes, adding the first pixel as a new background candidate to the background candidates and adding a new weighting corresponding to the new background candidate to the weightings; and
   detecting whether a moving object existing in an incoming image according to the background candidates and the weightings.

2. The method as claimed in claim 1, wherein the step of calculating the differences between the first pixel and the background candidates comprises:
   calculating first Euclidean distances between the first pixel and the background candidates.

3. The method as claimed in claim 1, wherein the step of updating the first background candidate corresponding to the minimum difference by adding the first factor to the first background candidate comprises:
   updating the first background candidate according to:

$$B(x,y)_{win}' = B(x,y)_{win} + \alpha[p_t(x,y) - B(x,y)_{win}],$$

wherein $p_t(x,y)$ is a pixel intensity value of the first pixel, $(x,y)$ is a coordinate, $B_{win}(x,y)$ is a background intensity value of the first background candidate, $\alpha$ is the first learning rate and $B_{win}(x,y)'$ is a background intensity value of the updated first background candidate.

4. The method as claimed in claim 3, wherein the step of updating the first weighting related to the first background candidate by adding the second factor to the first weighting comprises:
updating the first weighting according to:

$$\pi(x,y)_{win}' = \pi(x,y)_{win} + \beta[Y_t(x,y) - \pi(x,y)_{win}],$$

wherein $Y_t(x,y)$ is the first output value, $(x,y)$ is a coordinate, $\pi(x,y)_{win}$ is the first weighting, $\beta$ is the second learning rate and $\pi(x,y)_{win}'$ is the updated first weighting.

5. The method as claimed in claim 4, wherein the incoming image at least comprises a block, the block at least comprises an incoming pixel, and the step of detecting whether the moving object existing in the incoming image according to the background candidates and the weightings comprises:
calculating second Euclidean distances between the incoming pixel and the background candidates corresponding to the incoming pixel;
summing the second Euclidean distances to calculate a summed distance corresponding to the incoming pixel;
summing the summed distance of each of a plurality of pixels comprised in the block to calculate a first parameter of the block;
determining whether the first parameter of the block is smaller than a second threshold;
if yes, linearly combining the second Euclidean distances according to the weightings to calculate a second output value of the incoming pixel;
determining whether the second output value is smaller than a third threshold;
if yes, determining the incoming pixel corresponds to the moving object.

6. The method as claimed in claim 5, wherein after the step of determining whether the first parameter of the block is smaller than the second threshold, further comprising:
if the first parameter of the block is not smaller than the second threshold, determining the block corresponds to a background.

7. The method as claimed in claim 5, wherein after the step of determining whether the second output value is smaller than the third threshold, further comprising:
if the second output value is not smaller than the third threshold, determining the incoming pixel corresponds to a background.

8. An image processing apparatus, comprising:
a storage unit, configured to store a plurality of modules; and
a processing unit, coupled to the storage unit and configured to execute the modules to:
receive an training image, which at least comprises a first pixel;
calculate differences between the first pixel and a plurality of background candidates, wherein the background candidates are pixels respectively locating on other previously processed training images, and a coordinate of each background candidates is identical to a coordinate of the first pixel;
find a minimum difference among the differences;
determine whether the minimum difference is larger than a first threshold;
if no, generate a first output value according to the background candidates and a plurality of weightings corresponding to the background candidates;
update a first background candidate corresponding to the minimum difference by adding a first factor to the first background candidate, wherein the first factor is related to the first pixel, a first learning rate and the first background candidate;
update a first weighting related to the first background candidate by adding a second factor to the first weighting, wherein the second factor is related to the first output value, a second learning rate and the first weighting
if yes, add the first pixel as a new background candidate to the background candidates and adding a new weighting corresponding to the new background candidate to the weightings; and
detect whether a moving object existing in an incoming image according to the background candidates and the weightings.

9. The image processing apparatus as claimed in claim 8, wherein the processing unit calculates first Euclidean distances between the first pixel and the background candidates.

10. The image processing apparatus as claimed in claim 8, wherein the processing unit updates the first background candidate according to:

$$B(x,y)_{win}' = B(x,y)_{win} + \alpha[p_t(x,y) - B(x,y)_{win}],$$

wherein $p_t(x,y)$ is a pixel intensity value of the first pixel, $(x,y)$ is a coordinate, $B_{win}(x,y)$ is a background intensity value of the first background candidate, $\alpha$ is the first learning rate and $B_{win}(x,y)'$ is a background intensity value of the updated first background candidate.

11. The image processing apparatus as claimed in claim 10, wherein the processing unit updates the first weighting according to:

$$\pi(x,y)_{win}' = \pi(x,y)_{win} + \beta[Y_t(x,y) - \pi(x,y)_{win}],$$

wherein $Y_t(x,y)$ is the first output value, $(x,y)$ is a coordinate, $\pi(x,y)_{win}$ is the first weighting, $\beta$ is the second learning rate and $\pi(x,y)_{win}'$ is the updated first weighting.

12. The image processing apparatus as claimed in claim 11, wherein the incoming image at least comprises a block, the block at least comprises an incoming pixel, and the processing unit is configured to:
calculate second Euclidean distances between the incoming pixel and the background candidates corresponding to the incoming pixel;
sum the second Euclidean distances to calculate a summed distance corresponding to the incoming pixel;
sum the summed distance of each of a plurality of pixels comprised in the block to calculate a first parameter of the block;
determine whether the first parameter of the block is smaller than a second threshold;
if yes, linearly combine the second Euclidean distances according to the weightings to calculate a second output value of the incoming pixel;
determine whether the second output value is smaller than a third threshold;
if yes, determine the incoming pixel corresponds to the moving object.

13. The image processing apparatus as claimed in claim 12, wherein if the first parameter of the block is not smaller than the second threshold, the processing unit determines the block corresponds to a background.

14. The image processing apparatus as claimed in claim 12, wherein if the second output value is not smaller than the third threshold, the processing unit determines the incoming pixel corresponds to a background.

* * * * *